(12) United States Patent  
Eiyama

(10) Patent No.: US 10,735,621 B2  
(45) Date of Patent: Aug. 4, 2020

(54) PRINTING APPARATUS AND DETERMINATION METHOD

(71) Applicant: CANON KABUSHIKI KAISHA, Tokyo (JP)

(72) Inventor: Masato Eiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/288,272

(22) Filed: Feb. 28, 2019

(65) Prior Publication Data

US 2019/0260902 A1   Aug. 22, 2019

Related U.S. Application Data

(63) Continuation of application No. 15/082,415, filed on Mar. 28, 2016, now Pat. No. 10,264,156.

(30) Foreign Application Priority Data

Apr. 21, 2015   (JP) ................. 2015-087072

(51) Int. Cl.
```
H04N 1/23     (2006.01)
H04N 1/60     (2006.01)
H04N 1/00     (2006.01)
H04N 1/034    (2006.01)
```
(52) U.S. Cl.
CPC ......... *H04N 1/2323* (2013.01); *H04N 1/0075* (2013.01); *H04N 1/00724* (2013.01); *H04N 1/00726* (2013.01); *H04N 1/00734* (2013.01); *H04N 1/034* (2013.01); *H04N 1/6008* (2013.01); *H04N 1/6041* (2013.01); *H04N 1/6044* (2013.01); *H04N 2201/0094* (2013.01)

(58) Field of Classification Search
CPC ............... H04N 1/2323; H04N 1/6008; H04N 1/00724; H04N 1/00734; H04N 1/0075; H04N 1/034; H04N 1/00726; H04N 2201/0094
USPC ....................................................... 358/1.14
See application file for complete search history.

(56) References Cited

U.S. PATENT DOCUMENTS

| | | | |
|---|---|---|---|
| 3,748,046 A * | 7/1973 | Murray ..................... | G01J 3/50 356/425 |
| 6,351,308 B1 | 2/2002 | Mestha | |
| 6,425,650 B1 * | 7/2002 | Walker ..................... | B41J 2/125 347/14 |

* cited by examiner

*Primary Examiner* — Tammy Paige Goddard
*Assistant Examiner* — Darryl V Dottin
(74) *Attorney, Agent, or Firm* — Venable LLP

(57) ABSTRACT

A reflected light amount from a patch under a first light source is acquired, and a reflected light amount from the patch under a second light source whose wavelength band is different from the first light source is acquired. The type of a printing medium on which the patch is printed is determined based on the ratio of the two acquired reflected light amounts.

19 Claims, 11 Drawing Sheets

PRINTING APPARATUS AND DETERMINATION METHOD

This application is a continuation of application Ser. No. 15/082,415 filed Mar. 28, 2016.

BACKGROUND OF THE INVENTION

Field of the Invention

The present invention relates to a printing apparatus for printing on a printing medium and a determination method.

Description of the Related Art

Printing on a printing medium by an inkjet printing method is widely used because the apparatus arrangement is relatively inexpensive, and color stability is high. Printing media are provided for various purposes, including glossy/semiglossy paper, art paper, and coated paper for photo printing. On the printing apparatus side as well, parameters according to the characteristics of printing media are set to print images on the variety of printing media under optimum conditions. For example, an ink applying amount on a printing medium, a type of dye/pigment ink, and a conveyance amount and a conveyance speed in printing medium conveyance are set.

These parameters are set at the time of printing or before printing in accordance with the type of a printing medium. However, the type of a printing medium may be set by the user. For example, the user selects a printing medium from a list display via the user interface (UI) of a printer driver at the time of printing. Alternatively, when a printing medium is set on a printing apparatus, the user selects the type of the printing medium via a UI such as an operation panel formed on the printing apparatus.

On the other hand, since there are a variety of types of printing media, as described above, the user may make a selection error. If the user makes a selection error, the printing apparatus sets parameters for printing based on the user setting, and as a result, executes printing based on the wrong parameters.

In this case, if printing media have similar physical characteristics, the image only degrades. However, if printing media have different physical characteristics, ink overflow may take place to cause contamination in the printing apparatus, or ink transfer stain in the printing apparatus may be caused by wrong selection of dye/pigment ink. That is, the influence on the printing apparatus body may be fatal.

U.S. Pat. No. 6,425,650 describes comparing the reflection amounts of specular reflection and diffused reflection from a printing medium using a sensor including a specular reflection system and a diffused reflection system, and frequency-analyzing values continuously acquired by the sensor, thereby discriminating the type of the printing medium and selecting a print mode. In U.S. Pat. No. 6,425,650, the glossiness of the printing medium is detected from the ratio of specular reflection and diffused reflection, and the surface roughness of the printing medium is detected by frequency analysis, thereby discriminating the type of the printing medium.

The key factor of the physical characteristic that affects the main body, as described above, is the receptor layer of the surface of the printing medium. For example, whether to select dye ink or pigment ink is determined by the particle size relationship between ink and the receptor layer. For example, if the particles of the receptor layer are smaller than ink particles, as in so-called RC based glossy paper, the ink is fixed on the receptor layer. For this reason, if a wrong printing medium is selected, and printing is performed using an ink amount for it, the ink may be left on the surface of the printing medium and transferred to main body parts because of the ink amount that is not optimum. In coated paper or art paper, the particles of the receptor layer are generally formed large to preserve the texture of the paper. Hence, ink soaks into the base material of paper under the receptor layer and is fixed there. In such a printing medium, the amount of ink received by the receptor layer upon fixing is smaller than in the RC based glossy paper. For this reason, if printing is performed with a wrong ink amount, the ink may overflow on the printing medium, or the base material with the ink soaking may absorb water and deform, resulting in friction between the printhead and the printing medium.

As described above, the key factor to the feature of a printing medium is the structure of the receptor layer. The particle size of the receptor layer is several ten to several hundred µm. There are printing media of various thicknesses. Considering this, from the viewpoint of the cost and the sizes of optical system components, it is very difficult to optically construct a sensor capable of sufficiently ensuring a depth of field for a resolution of several ten to several hundred µm and build it in a printing apparatus.

SUMMARY OF THE INVENTION

An aspect of the present invention is to eliminate the above-mentioned problems with the conventional technology. The present invention provides a printing apparatus and a determination method capable of easily determining the type of a printing medium.

The present invention in one aspect provides a printing apparatus comprising: a first acquisition unit configured to acquire a reflected light amount from a patch under a first light source; a second acquisition unit configured to acquire a reflected light amount from the patch under a second light source whose wavelength band is different from the first light source; a determination unit configured to determine, based on a ratio of the reflected light amount acquired by the first acquisition unit to the reflected light amount acquired by the second acquisition unit, a type of a printing medium on which the patch is printed; and a print control unit configured to control to print an image on the printing medium based on a result of a determination by the determination unit.

Further features of the present invention will become apparent from the following description of exemplary embodiments with reference to the attached drawings.

DESCRIPTION OF THE EMBODIMENTS

Figure 1:
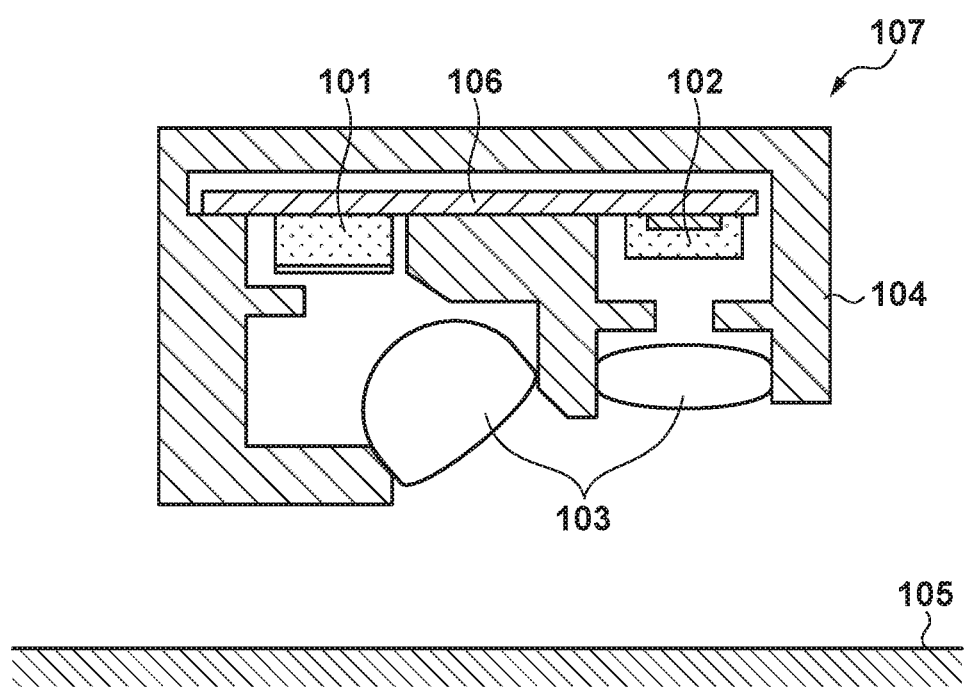
FIG. 1 is a view showing the arrangement of a read sensor used to determine the type of a printing medium.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

FIG. 1 is a view showing the arrangement of a read sensor used to determine the type of a printing medium. A sensor 107 is a read sensor sensor including a three-color LED 101 with three, R (red), G (green), and B (blue) light emission colors and one photodiode 102 having a spectral sensitivity characteristic in the visible light range. To detect a printing medium 105 and the colors of patches printed on the printing medium 105, the sensor 107 detects diffused reflection of light emitted by the light source on the printing medium 105. The light from the light source irradiates the printing medium 105 at an angle of about 45° via a lens 103. The photodiode 102 is configured to receive light in a direction vertical to the printing medium 105 via the lens 103. The light emitted by the LED 101 irradiates the printing medium 105 via an aperture 104 and the lens 103. The light reflected by the printing medium 105 enters the photodiode 102 via the lens 103 and the aperture 104.

Figure 2:
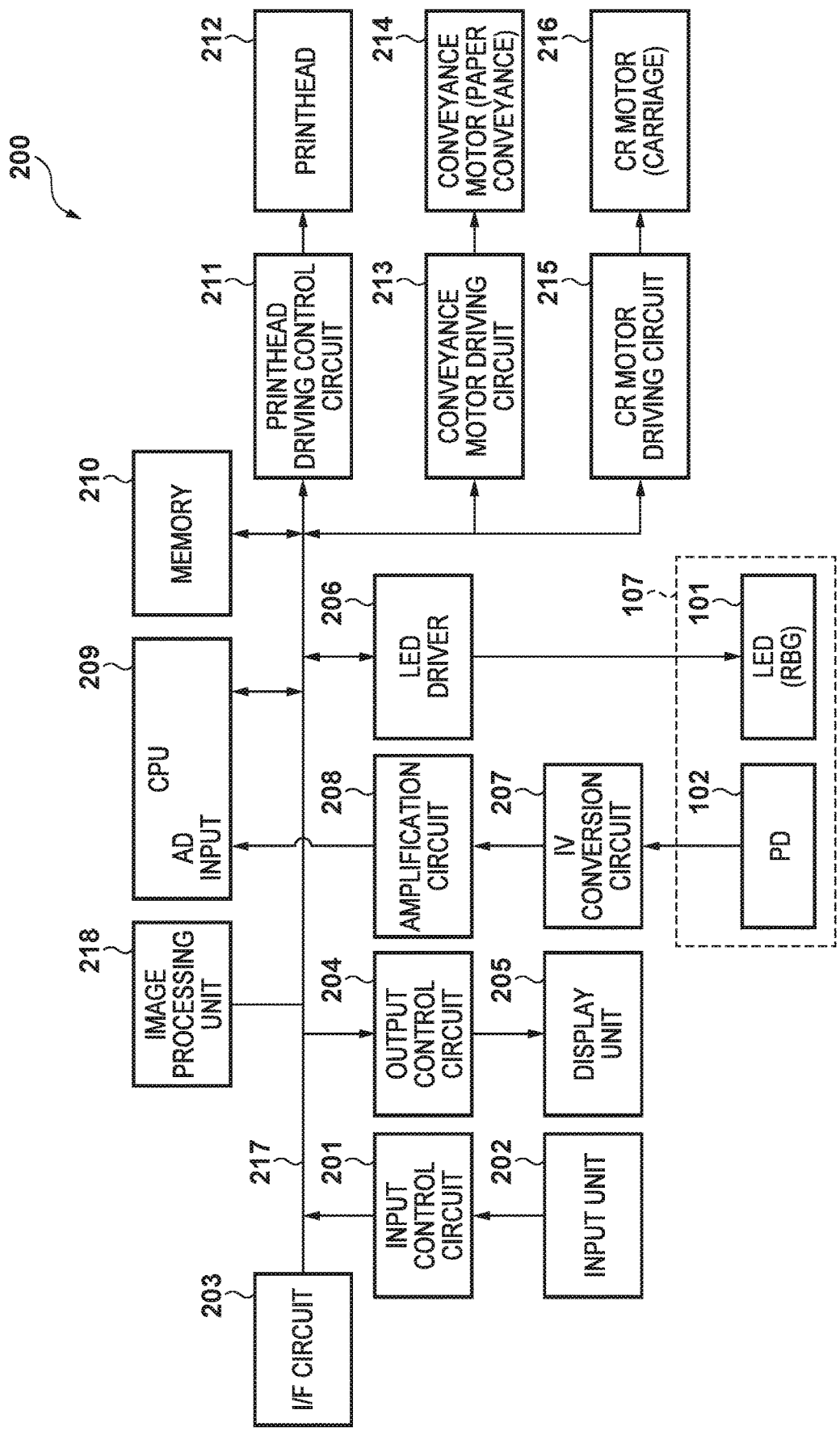
FIG. 2 is a block diagram showing the block arrangement of a printing apparatus.
Figure 3:
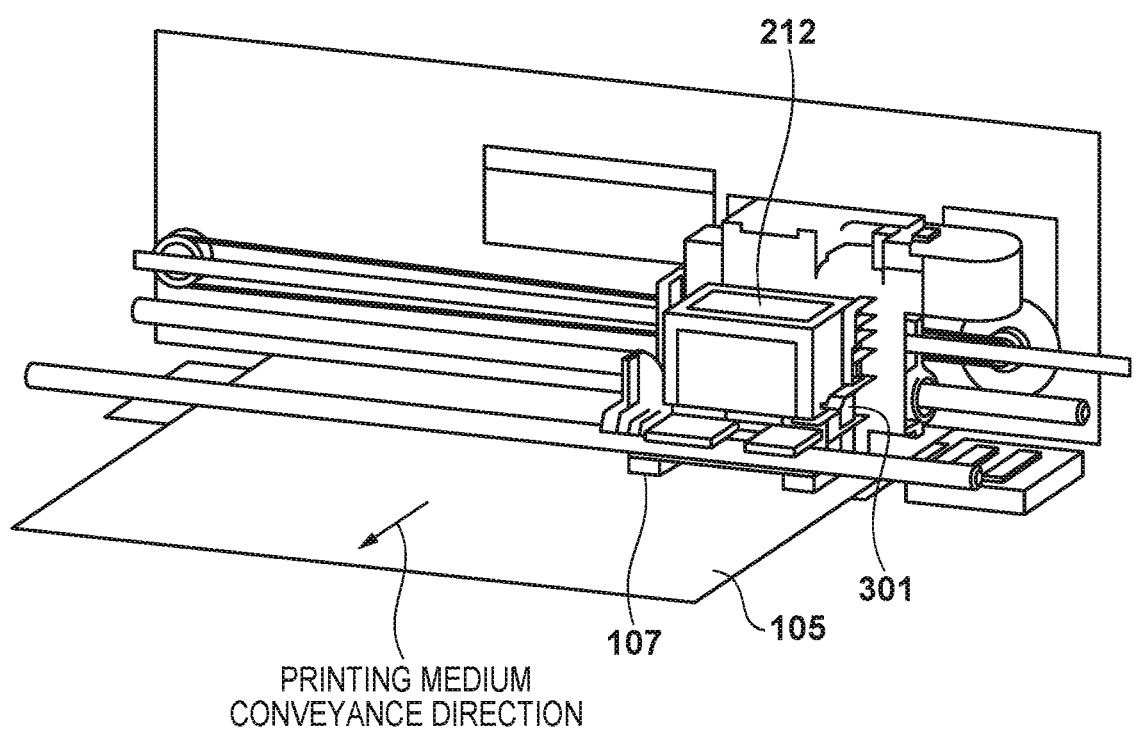
FIG. 3 is a view showing the structure in the vicinity of a printhead.

FIG. 2 is a block diagram showing the block arrangement of a printing apparatus. In this embodiment, an inkjet printing apparatus that prints on a printing medium by an inkjet printing method will be described as a printing apparatus 200. In this embodiment, the sensor 107 in FIG. 1 is formed near a carriage 301 of the printing apparatus 200, as shown in FIG. 3. The image of a patch or the like printed by a printhead 212 can optically be read by the sensor 107 while conveying the printing medium in a reverse direction. However, the arrangement is not limited to the above-described one, and any arrangement that optically reads the image of a patch or the like printed on the printing medium 105 is usable.

The LED 101 mounted on the sensor 107 is controlled by an LED driver 206 so as to independently emit R (red), B (blue), and G (green) light. The reflected light from the printing medium 105 is received by the photodiode 102 (light-receiving unit) and detected as a photocurrent. The detected photocurrent is converted into a voltage value by an IV conversion circuit 207 and input to the analog input terminal of a CPU 209 via an amplification circuit 208. The CPU 209 includes an AD converter. The signal input via the amplification circuit 208 is acquired as a digital value in the CPU 209.

An input unit 202 receives an instruction from a user. For example, the input unit 202 includes a power switch and an enter key and receives a power-ON instruction or a print execution instruction from the user. A display unit 205 displays various kinds of information of the printing apparatus 200 to the user. For example, the display unit 205 is an LED or LCD display, and displays information indicating that a power saving mode is set or setting screens of various kinds of functions executable by the printing apparatus 200. If the display unit 205 is a touch panel, it can receive a user instruction via software keys. The printing apparatus 200 will be described as an inkjet printing apparatus. However, the printing apparatus 200 may be formed as a multi function peripheral (MFP) that integrates a scan function, a FAX function, a transmission function, and the like in addition to a print function. The input unit 202 is connected to a system bus 217 via an input control circuit 201 so as to be capable of data transmission/reception. The display unit 205 is connected to the system bus 217 via an output control circuit 204 so as to be capable of data transmission/reception.

An interface (I/F) circuit 203 connects the printing apparatus 200 to an external network such as a LAN. The printing apparatus 200 transmits/receives various kinds of jobs and data to/from an external apparatus such as a host computer via the interface circuit 203. The interface circuit 203 can be adapted to a wired network or a wireless network. The interface circuit 203 may be adapted to short distance wireless communication (NFC or Bluetooth) in a communication distance of several cm to several ten cm. The printing apparatus 200 can also receive a print job or image data from, for example, a portable wireless terminal via the short distance wireless communication.

A memory 210 is a storage unit including, for example, a ROM and a RAM, and stores programs configured to execute various kinds of functions and control programs configured to control the printing apparatus 200. The memory 210 is also used as the working memory of the CPU 209. For example, a program stored in the ROM is loaded to the RAM and executed by the CPU 209, thereby implementing the processing of each flowchart to be described later. As the storage unit, a mass storage unit such as a hard disk (HDD) is also included. Various kinds of characteristic information used in this embodiment are stored in, for example, the hard disk.

A printhead driving control circuit 211 controls the printing operation, for example, the nozzle driving order of the printhead 212. The printhead 212 is, for example, a serial scan type printhead as shown in FIG. 3, and is connected to ink tanks containing inks. A plurality of nozzles that discharge ink droplets are formed. The printhead 212 can discharge ink droplets of, for example, C (cyan), M (magenta), Y (yellow), and K (black). The ink colors are not particularly limited to CMYK, and an ink tank adapted to a spot ink or the like may be mounted. The printhead 212 is not limited to a serial scan type printhead and may be a line head type printhead including a nozzle array throughout the printable region. The printhead driving control circuit 211 supplies a driving signal according to print target image data to a nozzle driving circuit mounted on the printhead 212 and including a selector and a switch.

FIG. 3 is a view showing the structure in the vicinity of the printhead 212. FIG. 3 shows a serial scan type printhead. The carriage 301 reciprocally moves along a guide rail in a direction crossing the conveyance direction of the printing medium 105. As shown in FIG. 3, the printhead 212 is constructed on the carriage 301, and scans the printing medium 105 as the carriage 301 moves. The printhead 212 and the printhead driving control circuit 211 are connected by a flexible cable. The printing medium 105 is conveyed in the conveyance direction in FIG. 3 by an LF (Line Feed) roller that is driven by a conveyance motor 214. For example, the printing medium 105 is alternately scanned and conveyed by a predetermined amount, thereby printing an image on the printing medium 105. The sensor 107 shown in FIG. 1 is formed under the carriage 301, as shown in FIG. 3, and can scan an image on the printing medium 105 and optically read it as the carriage 301 moves.

A conveyance motor driving circuit 213 controls the conveyance motor 214 so as to convey the printing medium 105 appropriately in synchronism with the movement of the carriage 301 and the like. A carriage (CR) motor 216 controls the movement of the carriage 301. A carriage motor driving circuit 215 drives a carriage motor based on print target image data.

Print target image data is, for example, received from the outside via the interface circuit 203 and stored in the storage unit or stored in the storage unit such as the HDD in advance. The print target image data is, for example, image data created by an application or patch image data aiming at calibration. The CPU 209 reads out the image data from the storage unit and controls an image processing unit 218, thereby executing conversion (binarization processing) to data for printing using the printhead 212. The image processing unit 218 executes various kinds of image processing such as color space conversion, HV conversion, gamma correction, and image rotation in addition to binarization processing.

Printing medium type determination processing according to this embodiment will be described below. In this embodiment, using two color light sources provided in the sensor 107, reflected light amounts from a patch printed on the printing medium 105 are measured, and the type of the printing medium is determined based on the ratio of the two reflected light amounts.

Figure 4:
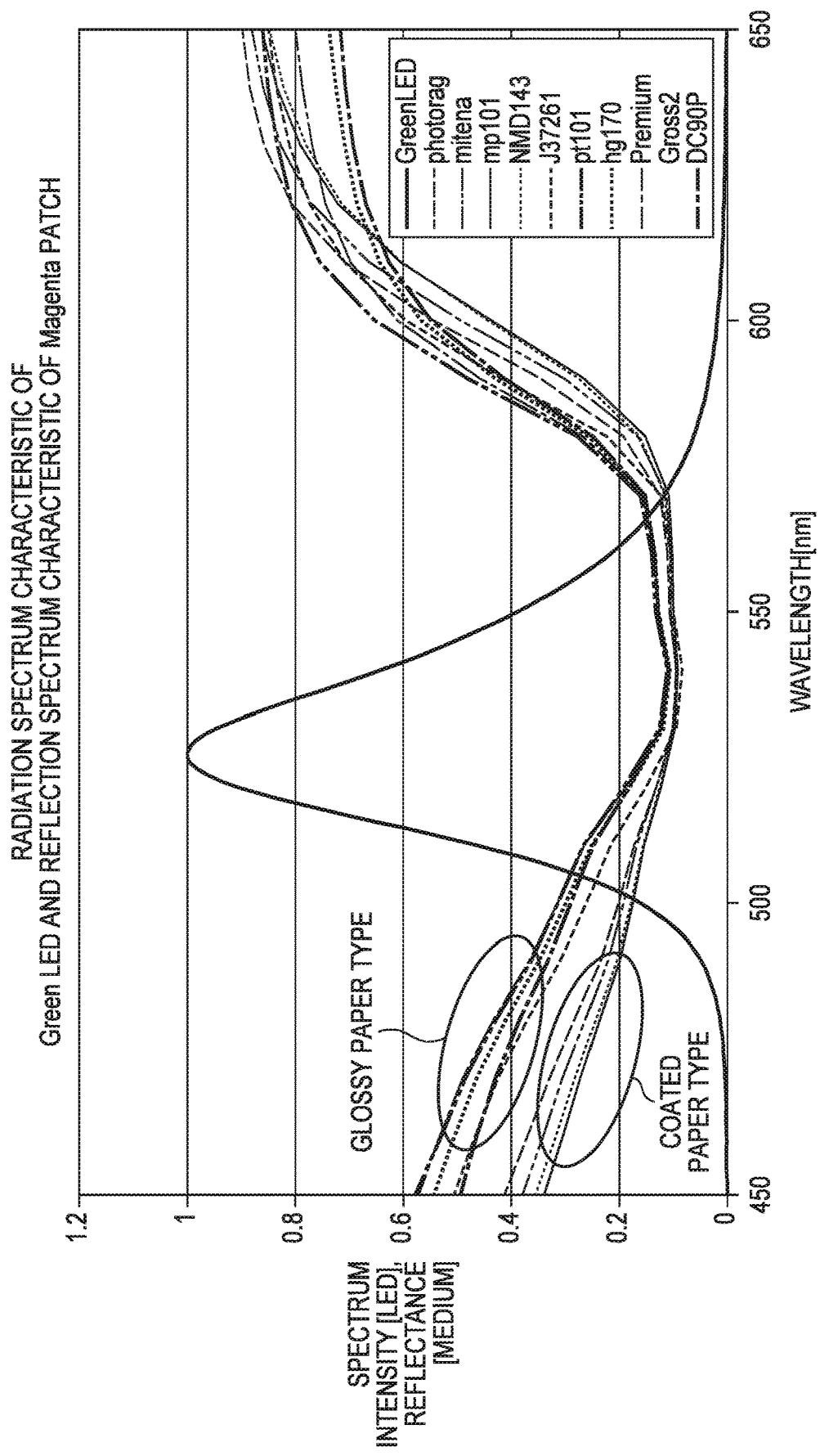
FIG. 4 is a graph showing the spectral characteristics of a Green LED and a magenta patch.

FIG. 4 is a graph showing the emission spectrum distribution of a Green LED and the reflection spectra of patches printed on a plurality of types of printing media using magenta ink such that almost equal reflected light amounts can be obtained by measurement using the Green LED light source. The spectrum shapes of the patches are roughly classified into two types. One is a spectrum shape corresponding to printing media such as glossy paper, semiglossy paper, and proof paper having a receptor layer with particles smaller than ink particles. A printing medium of this type exhibits a spectrum shape in which the reflection spectrum of the ink particles themselves is dominant because ink is fixed on the receptor layer. The other is a spectrum shape corresponding to printing media such as coated paper, art paper, and plain paper having a receptor layer with particles larger than ink particles or having no receptor layer but including large paper fibers. A printing medium of this type exhibits a spectrum shape affected by the ground color of paper because printed ink enters the receptor layer or among paper fibers.

Figure 5:
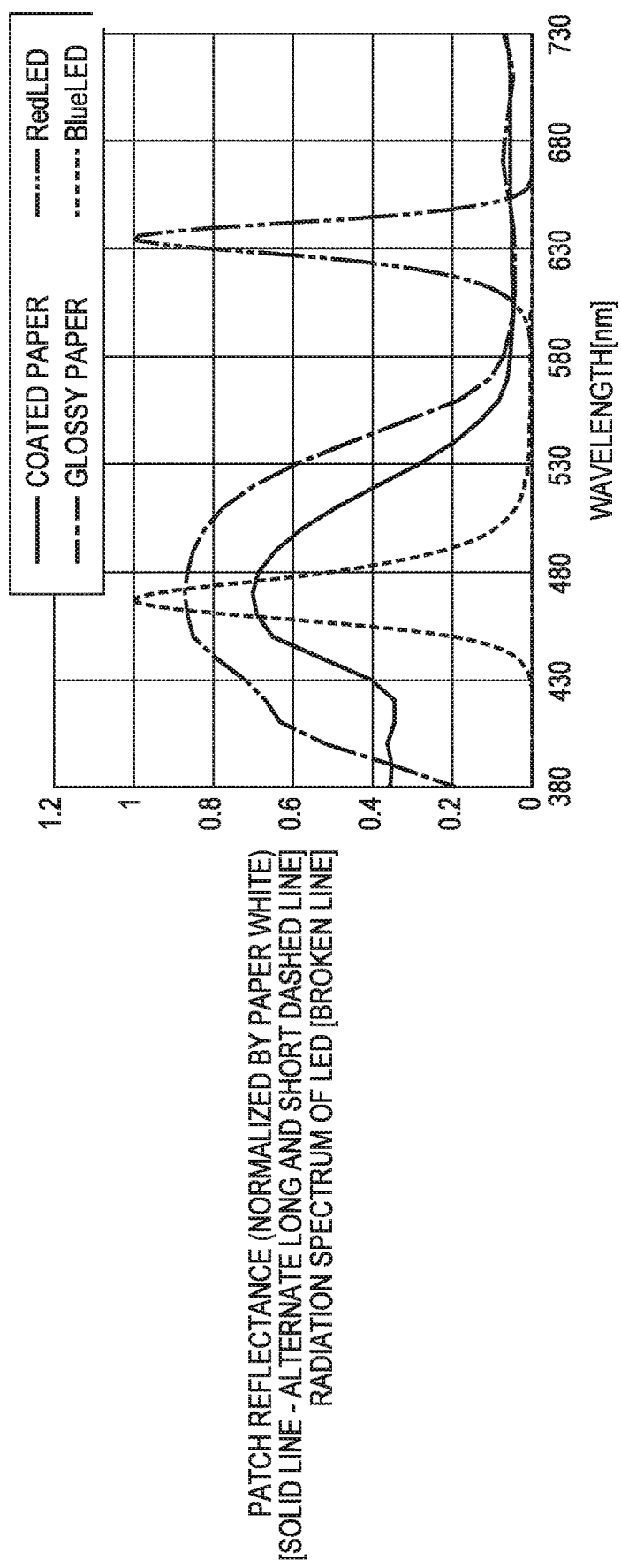
FIG. 5 is a graph showing the spectral characteristics of a Blue LED, a Red LED, and a cyan patch.

FIG. 5 is a graph showing the reflection spectra of cyan patches normalized by the reflected light amount of paper white and the reflection spectra of a Blue LED and a Red LED on coated paper and glossy paper. The reflected light amounts measured by the sensor 107 are the product sums of the reflection spectra of the patches and the reflection spectra of the LEDs. As shown in FIG. 5, in measurement under the Red LED, almost equal reflected light amounts are obtained on the coated paper and the glossy paper. In measurement under the Blue LED, however, the reflected light amount of the glossy paper type is larger than the reflected light amount of the coated paper type. In this embodiment, the type of a printing medium is determined using this characteristic. That is, the type of a printing medium is determined by measuring reflected light amounts by two color light sources that have different emission spectrum distributions for the characteristic of a certain ink color.

Figure 6:
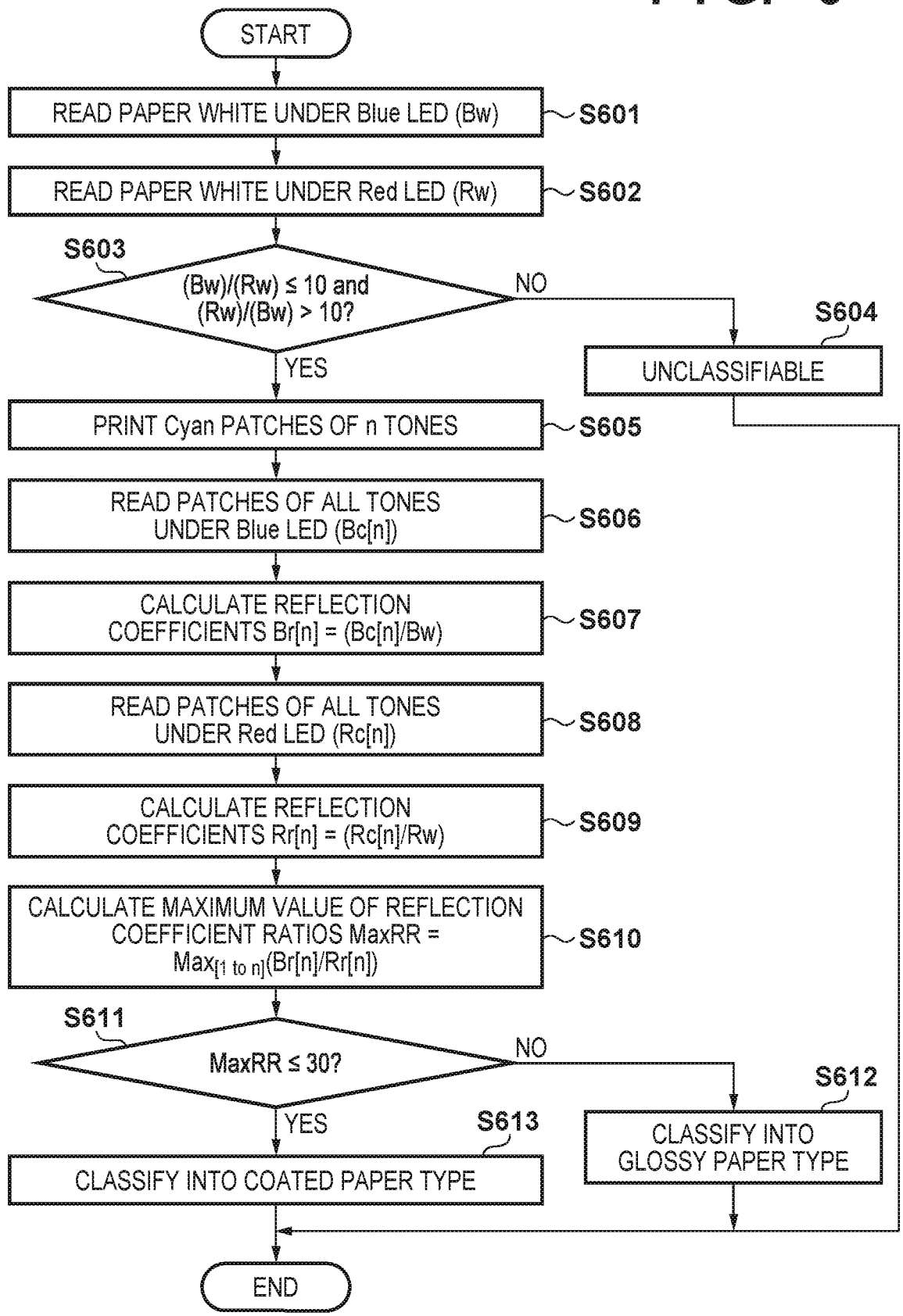
FIG. 6 is a flowchart showing the procedure of printing medium classification processing.

FIG. 6 is a flowchart showing the procedure of printing medium classification processing (determination processing). The processing shown in FIG. 6 is implemented when, for example, the CPU 209 loads a program stored in the ROM to the RAM and executes it.

First, in steps S601 and S602, it is determined whether the printing medium 105 is a printing medium classifiable by the processing shown in FIG. 6. For example, before printing a target patch image (to be simply referred to as a patch hereinafter), in step S601, the CPU 209 turns on the Blue LED and measures the reflected light amount from the paper white portion of the printing medium 105. In step S602, the CPU 209 individually turns on the Red LED and measures the reflected light amount from the paper white portion of the printing medium 105.

In step S603, the CPU 209 determines whether the ratio of the reflected light amounts obtained by measuring the paper white portion of the printing medium under the Blue LED and the Red LED is 10 or less. Upon determining that the ratio is 10 or less, in step S604, the CPU 209 determines that the printing medium 105 is unclassifiable, and ends the processing shown in FIG. 6.

That is, the determination processing of step S603 is determining whether the measurement target printing medium is colored in advance. If a printing medium is colored in advance, it may be impossible to correctly classify the printing medium because the color of the printing medium may be superimposed on the reflected light amount of a printed patch. For this reason, it is determined in step S603 whether classification processing is possible. In step S603, the reflected light amounts obtained in steps S601 and S602 are directly compared. This is because the reflected light amounts from the printing medium 105 by the Blue LED and the Red LED are normalized in advance using a white reference board. However, even if the reflected light amounts are not normalized, they may be normalized using a reference patch other than the printing medium 105. Alternatively, an achromatic patch may be printed on the printing medium 105 and measured using both the Blue LED light source and the Red LED light source, and the normalization processing may be performed based on the reflected light amounts. The reference value of the ratio of the reflected light amounts is set to 10 in step S603. However, the reference value may appropriately be set in accordance with the tolerance to coloring of a printing medium corresponding to the accuracy of printing medium classification.

Figure 7:
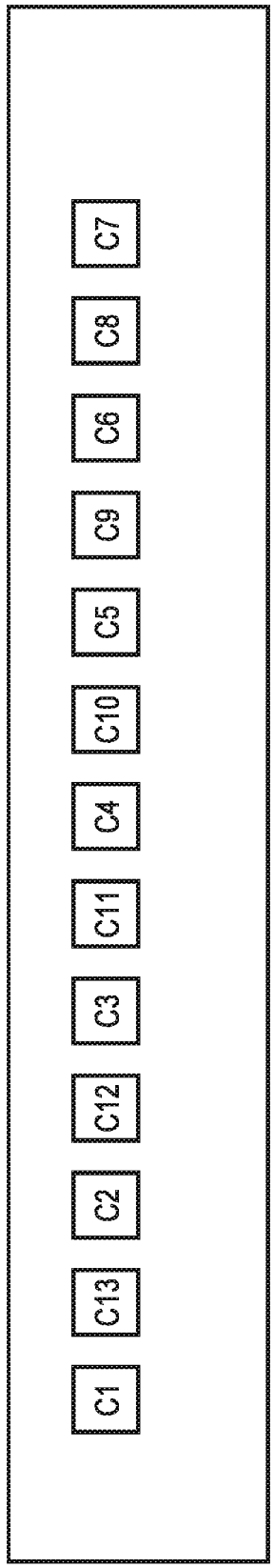
FIG. 7 is a view showing a patch chart for printing medium classification.

Upon determining in step S603 that the printing medium is classifiable, the process advances to step S605 to print a patch chart for printing medium classification. FIG. 7 is a view showing a patch chart for printing medium classification. The patch chart is formed from, for example, cyan patches of 13 tones arranged in the scanning direction of the sensor 107. As for the patch arrangement, the ink droplet applying amount increases from a patch C1 to a patch C13 so as to increase the density. In addition, the patches are arranged so as to raise the density stepwise for every other patch from the patch C1 to the patch C7 at the turn and then similarly raise the density for every other patch in the reverse direction. This prevents printed paper from having a concave-shaped curl due to concentration of high-density patches to one point. In addition, unprinted region are provided between the patches. This also prevents printed paper from having a concave-shaped curl.

When patch printing ends, in step S606, the CPU 209 turns on the Blue LED and acquires a light reception signal from the sensor 107 while moving the carriage 301 in the scanning direction, thereby measuring reflected light amounts from the printed patches corresponding to all tones. At this time, to prompt ink fixing on the printing medium 105 before measurement, a predetermined wait time may be provided. When reflected light amount measurement under the Blue LED ends, in step S607, the CPU 209 calculates the ratio of the reflected light amount to that of the paper white portion of the printing medium 105 measured in step S601 for each of the patches corresponding to the respective tones.

In step S608, the CPU 209 turns on the Red LED and acquires a light reception signal from the sensor 107 while moving the carriage 301 in the scanning direction, thereby measuring reflected light amounts from the printed patches corresponding to all tones. When reflected light amount measurement under the Red LED ends, in step S609, the CPU 209 calculates the ratio of the reflected light amount to that of the paper white portion of the printing medium 105 measured in step S602 for each of the patches corresponding to the respective tones.

Figure 8:
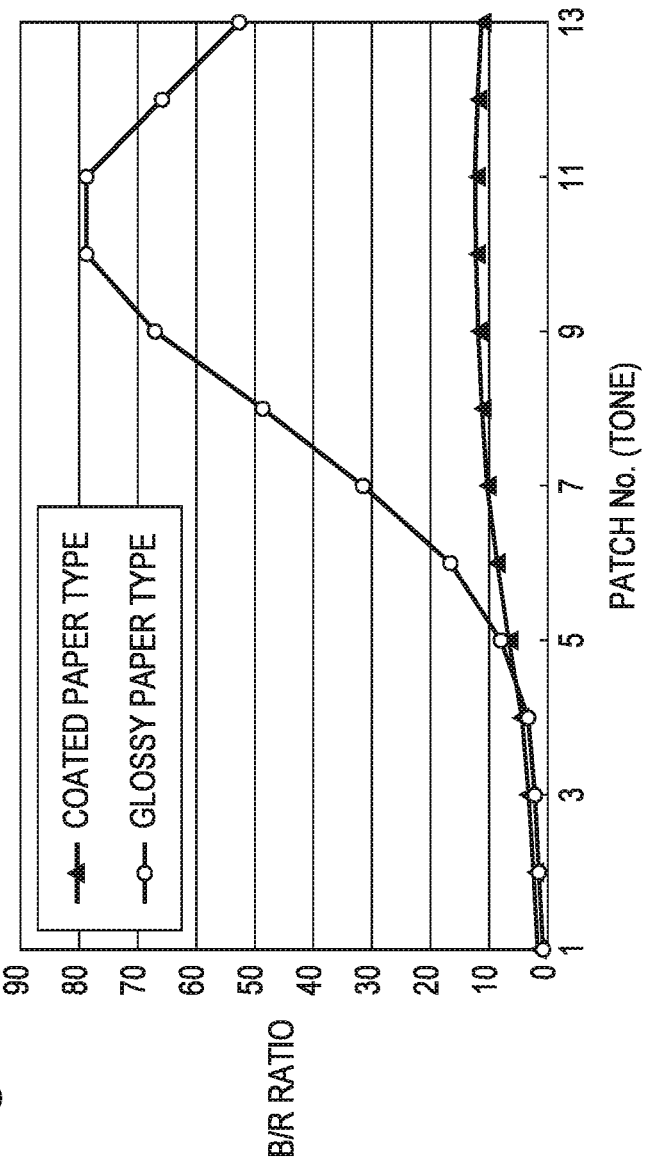
FIG. 8 is a graph showing a change in the reflected light amount ratio between the Blue LED and the Red LED.

By steps S607 and S609, reflected light amounts measured by both the Blue LED light source and the Red LED light source are obtained for each of the patches corresponding to the tones of cyan. In step S610, the CPU 209 obtains the maximum value of the reflected light amount ratios based on these results. That is, for measurement results Br[n] and Rr[n] (n: tone) of the patches corresponding to the tones, Br[n]/Rr[n] is calculated for all tones, and a maximum value MaxRR out of the numerical values is obtained. FIG. 8 is a graph having an abscissa representing the patch tone n and an ordinate representing Br[n]/Rr[n]. MaxRR represents the maximum value along the ordinate. Note that Br[n] is the reflected light amount of each tone measured under the Blue LED, and Rr[n] is the reflected light amount of each tone measured under the Red LED.

As shown in FIG. 8, the higher the tone is, the steeper Br[n]/Rr[n] changes on the glossy paper. As described above with reference to FIG. 5, for the Blue LED, the reflected light amount on the glossy paper is larger than the reflected light amount on the coated paper. On the other hand, for the Red LED, the reflected light amount on the glossy paper almost equals the reflected light amount on the coated paper. Hence, as shown in FIG. 8, when the tone rises, B/R changes more largely on the glossy paper than on the coated paper.

In step S611, the CPU 209 determines whether MaxRR calculated in step S610 is 30 or less. Upon determining that MaxRR is 30 or less, the process advances to step S613, and the CPU 209 classifies (determines) the measurement target printing medium 105 as a coated paper type. On the other hand, upon determining that MaxRR exceeds 30, the process advances to step S612, and the CPU 209 classifies (determines) the measurement target printing medium 105 as a glossy paper type. The reference value for determination in step S611 need not be 30, and may appropriately be set in accordance with, for example, the accuracy of classification or a specific printing medium product of the coated paper type/glossy paper type. After the process of step S612 or S613, the processing shown in FIG. 6 ends.

When the printing medium type is determined by the processing shown in FIG. 6, a setting in the printing apparatus may be decided based on the determination result. For example, in a case in which the printing apparatus has two types of black inks, that is, pigment and dye inks, parameters for printing media are set such that the dye ink is used when the printing medium is determined to be of the glossy paper type, and the pigment ink is used when the printing medium is determined to be of the coated paper type. For example, the parameters may be stored in the printing apparatus body in advance and enabled when the user selects the printing medium on an operation panel or the like. The parameters may be stored in a host computer connected to the printing apparatus and used at the time of paper setting by the printer driver.

The processing shown in FIG. 6 may be executed in the procedure of adding a new printing medium to the printing apparatus by the user. Alternatively, the processing may be executed when the user instructs to do printing medium determination processing.

In the processing shown in FIG. 6, the printing medium determination processing is performed using a 13-tone patch chart. With this arrangement, the influence of variations in the reflected light amount between printing media on the ink applying amount can be reduced. However, only the measurement result of the patch of an arbitrary tone may be compared with the reference value in the process of step S611.

In the processing shown in FIG. 6, the reflected light amounts of the patch chart are measured under the Blue LED and the Red LED, and the printing medium is determined using the ratios of reflected light amounts of the two color light sources. With this arrangement, the printing medium classification processing can be performed independently of ink overflow or individual variations in the discharge amount between printheads for printing patches. However, if the individual differences in the discharge amount between the printheads for a printing medium are small, the determination may be performed using the ratio of the reflected light amount itself of only the Red LED. As described above, for a printing medium of a glossy paper type, the reflected light amount from each patch exhibits a feature of the spectrum of ink itself. For a printing medium of a coated paper type, there is an influence of paper white of the printing medium. Hence, when, for example, a cyan patch is measured under the Red LED light source, the maximum density changes between glossy paper and coated paper. Using this characteristic, coated paper type or glossy paper type classification processing may be performed by printing a multi-tone patches and measuring the maximum density.

In step S603 of FIG. 6, if the ratio of the reflected light amounts of the two colors falls within a predetermined range (for example, 10), the printing medium is determined to be unclassifiable, and the processing ends. However, when the printing medium is determined to be unclassifiable, the LED colors and the patch colors may be changed, and the measurement may be performed again. For example, magenta patches may be read under the Blue LED and the Green LED.

The determination processing shown in FIG. 6 is performed using light sources of a plurality of wavelength bands in which the ratio of reflected light amounts changes along with the change in the patch density. That is, the determination processing shown in FIG. 6 can also be performed using an arrangement including one light source and a light-receiving unit capable of spectroscopy. For example, the determination processing shown in FIG. 6 may be performed using a combination of a white LED and a photo IC with RGB color filters, a general densitometer including one light source and color filters, or a spectrocolorimetric sensor. When a densitometer is used, a printing medium can be classified by measuring patches, as in FIG.

6, and calculating the ratio of values for R and B received via the color filters obtained by the densitometer for reflection from the printing medium. When a spectrocolorimetric sensor is used, the same result can be obtained from the reflectance ratio of values in specific wavelength bands, for example, for the cyan patches shown in FIG. 7, a value in a band of about 450 nm and a value in a band of about 650 nm.

As described above, according to this embodiment, it is possible to determine the type of a printing medium by a simple arrangement without needing a complex optical structure.

[Density Measurement and Sensor Correction Method]

A density measurement method using the printing medium classification processing shown in FIG. 6 will be described next.

Figure 9:
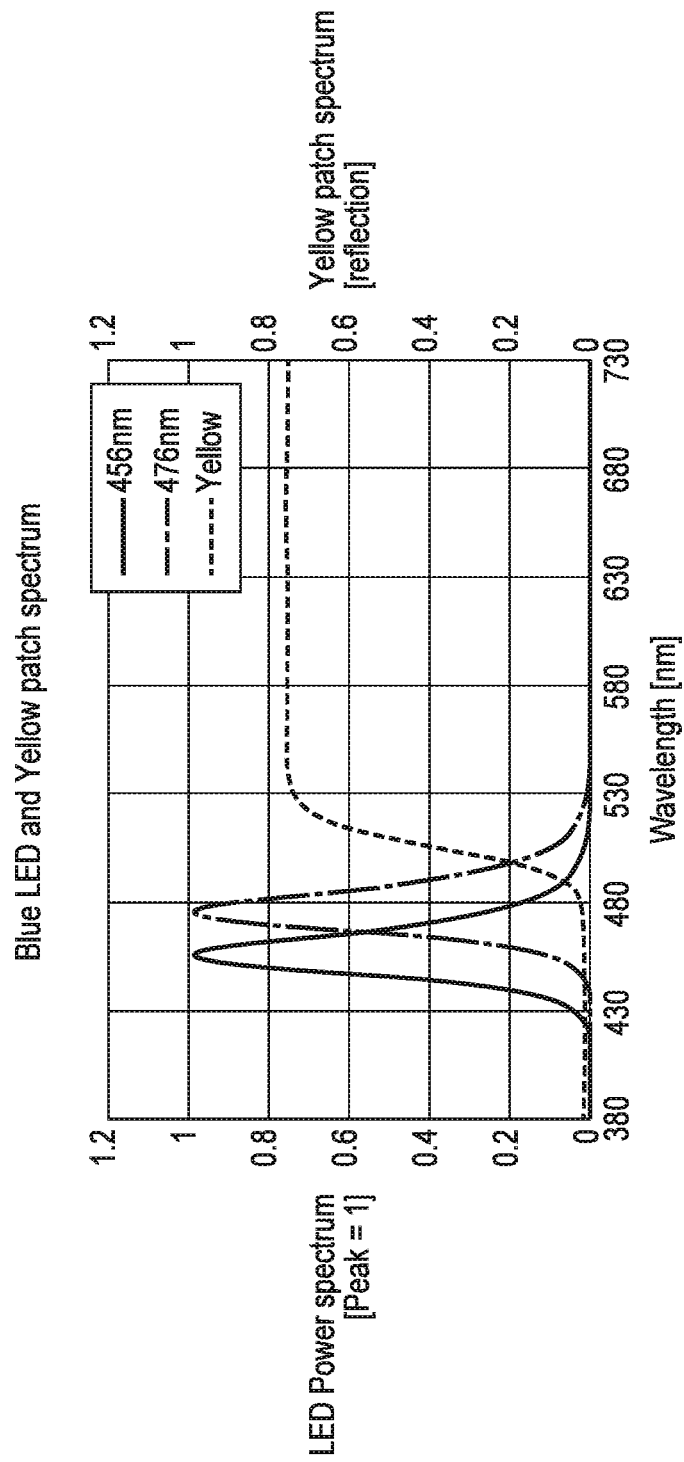
FIG. 9 is a graph for explaining a variation in the radiation spectrum of the Blue LED.

The light sources mounted in the sensor shown in FIG. 1 are LEDs of RGB colors. There are individual variations in the radiation spectrum shapes of the respective colors. For example, the peak wavelength varies by about 20 nm for each of the three colors. FIG. 9 is a graph showing the spectral reflectance characteristic of a yellow patch printed by yellow ink and the radiation spectrum of the Blue LED. When the Blue LED irradiates the yellow patch, the diffused reflection light amount from the patch is the product sum of the radiation spectrum of the Blue LED and the radiation spectrum of the patch. Hence, if the radiation spectrum shifts in the wavelength direction due to individual variations of Blue LEDs, the reflected light amount from the patch changes depending on the individual Blue LED. For example, in the spectrum combinations of the Blue LEDs and the yellow patch shown in FIG. 9, when the two sensors having peak wavelengths of 456 nm and 476 nm, respectively, in the spectrum shape on the Blue LED side are compared, a difference of 1.6 times is generated between the reflected light amounts from the yellow patch.

As the characteristic features of the inkjet printing method, color output can stably be performed up to a high density, and color calibration can be performed at a relatively low cost, as compared to other printing methods. Some inkjet printing apparatuses have a closed loop color calibration function of maintaining constant colors as an application to do accurate color management. In general, to increase the convenience for users, the printing apparatus includes a colorimeter or densitometer and, when the user instructs to execute calibration, automatically prints a patch chart for calibration. After that, colorimetry is performed by the internal sensor, and the result is fed back, thereby executing calibration. Since high calibration accuracy is required, chart measurement needs to be done at high accuracy.

When the radiation spectra of LEDs and the radiation spectra of printing media are held in advance, density measurement can easily be performed at high accuracy. If the radiation spectra of printing media and the radiation spectra of individual LEDs are known in advance, as described above, a difference with respect to a reflected light amount measured by another LED individual can be estimated.

A sensor formed from LEDs having known radiation spectra LED_Rref($\lambda$), LED_Gref($\lambda$), and LED_Bref($\lambda$) and a photodiode having a light-receiving spectral sensitivity PDref($\lambda$) is defined as a reference sensor. A sensor having the same arrangement and formed from LEDs n having other known radiation spectra LED_Rn($\lambda$), LED_Gn($\lambda$), and LED_Bn($\lambda$) and a photodiode having a light-receiving spectral sensitivity PDn($\lambda$) is defined as a sensor n. A color patch having a reflection spectrum Ry($\lambda$) is measured by the two sensors under the Blue LED. Let Iref be the light-receiving amount measured by the reference sensor, and In be the light-receiving amount measured by the sensor n. The light-receiving amounts are calculated by $$\text{Iref}\_B = \Sigma[\lambda=400 \text{ to } 700]\{\text{LED\_Bref}(\lambda) \cdot \text{Ry}(\lambda) \cdot \text{PDref}(\lambda)\} \quad (1)$$

$$\text{In}\_B = \Sigma[\lambda=400 \text{ to } 700]\{\text{LED\_Bn}(\lambda) \cdot \text{Ry}(\lambda) \cdot \text{PDn}(\lambda)\} \quad (2)$$

That is, if the spectra of LEDs, photodiodes, and a color patch are known, a result measured by one individual of a plurality of sensors can be simulated to a result measured by another individual. As a result, reflected light amounts measured by the plurality of sensors with variations can be corrected as results measured by one reference sensor (sensor correction), and accurate reflectance measurement and density measurement can be done while suppressing errors caused by the individual differences between the sensors.

As for the information of the spectra of the LEDs and photodiodes, for example, a result measured in advance for each sensor unit is saved in the internal memory of the sensor or in the printing apparatus body before the sensor is mounted on the printing apparatus. Generally, in a photodiode without filters on light-receiving elements, the light-receiving sensitivity for the spectral wavelength moderately changes as compared to the spectrum of a patch or an LED. That is, the degree of contribution to the above-described light-receiving amounts Iref and In is low. Hence, instead of measuring the spectrum of individual photodiodes, the information of a spectra measured in one individual may be saved as a representative. On the other hand, a patch exhibits different spectral reflectance characteristics depending on a printing medium. However, it is difficult to save the information of spectral reflectance characteristics for all printing media. For this reason, the information of a representative spectral reflectance characteristic may be saved using a determination result obtained by the printing medium determination processing shown in FIG. 6.

As described above, the reflection spectrum of a printing medium is affected by the relationship between the receptor layer of the printing medium and the particle size of printed ink. Printing media determined to be of a glossy paper type exhibit close spectral reflectance characteristics of ink. Printing media determined to be of a coated paper type also exhibit close spectral reflectance characteristics. Hence, the information of a representative reflection spectrum is held for each of the printing media of the glossy paper type and the coated paper type. As will be described later with reference to FIGS. 11A and 11B, correction using the information of the reflection spectrum is performed based on the determination result in FIG. 6 at the time of density measurement. As a result, the information of the reflection spectrum need not be saved for all of individual printing media, and sensor correction can easily be performed at high accuracy.

Figure 10:
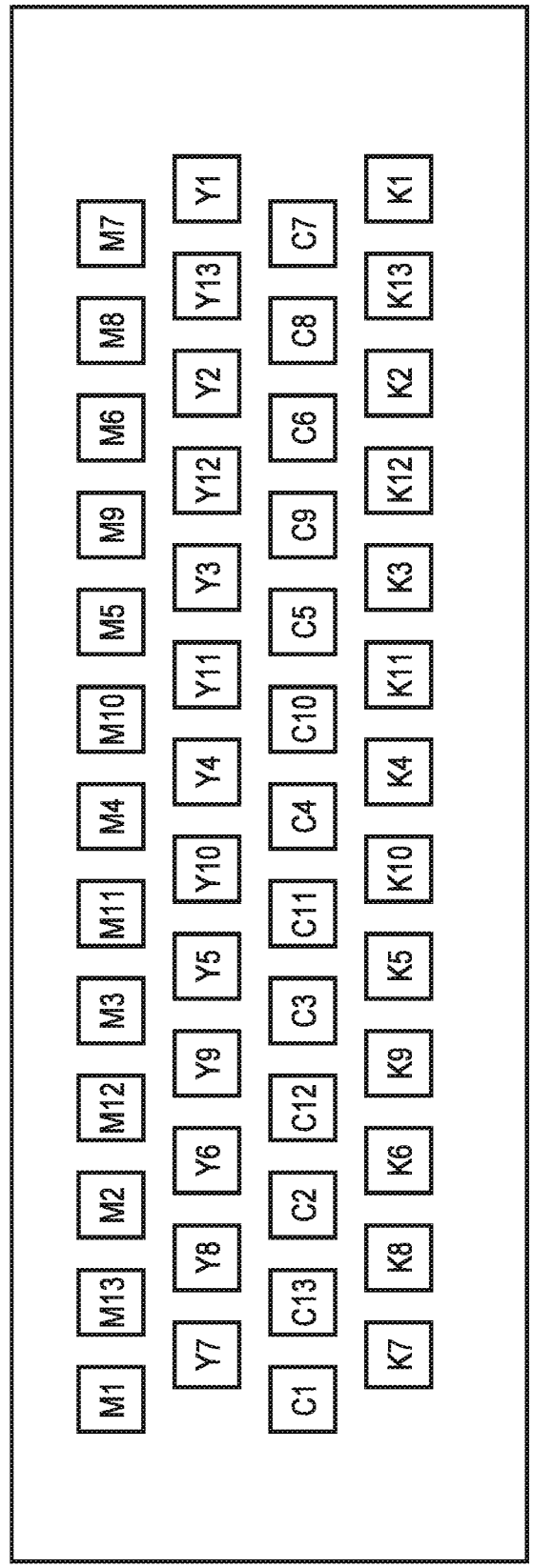
FIG. 10 is a view showing a CMYK density measurement chart used in density measurement processing.
Figure 11A:
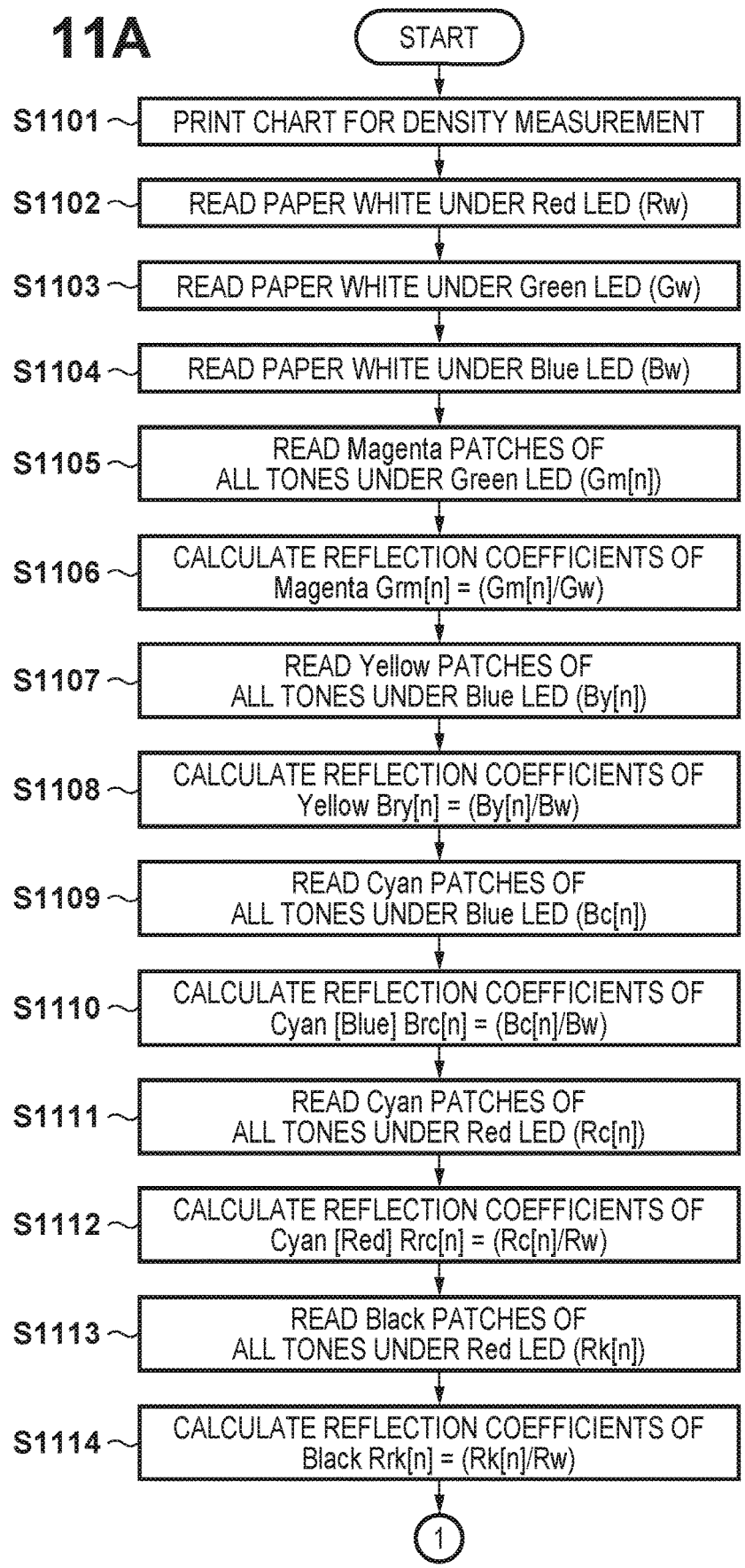
FIGS. 11A and 11B are flowcharts showing the procedure of density measurement processing.
Figure 11B:
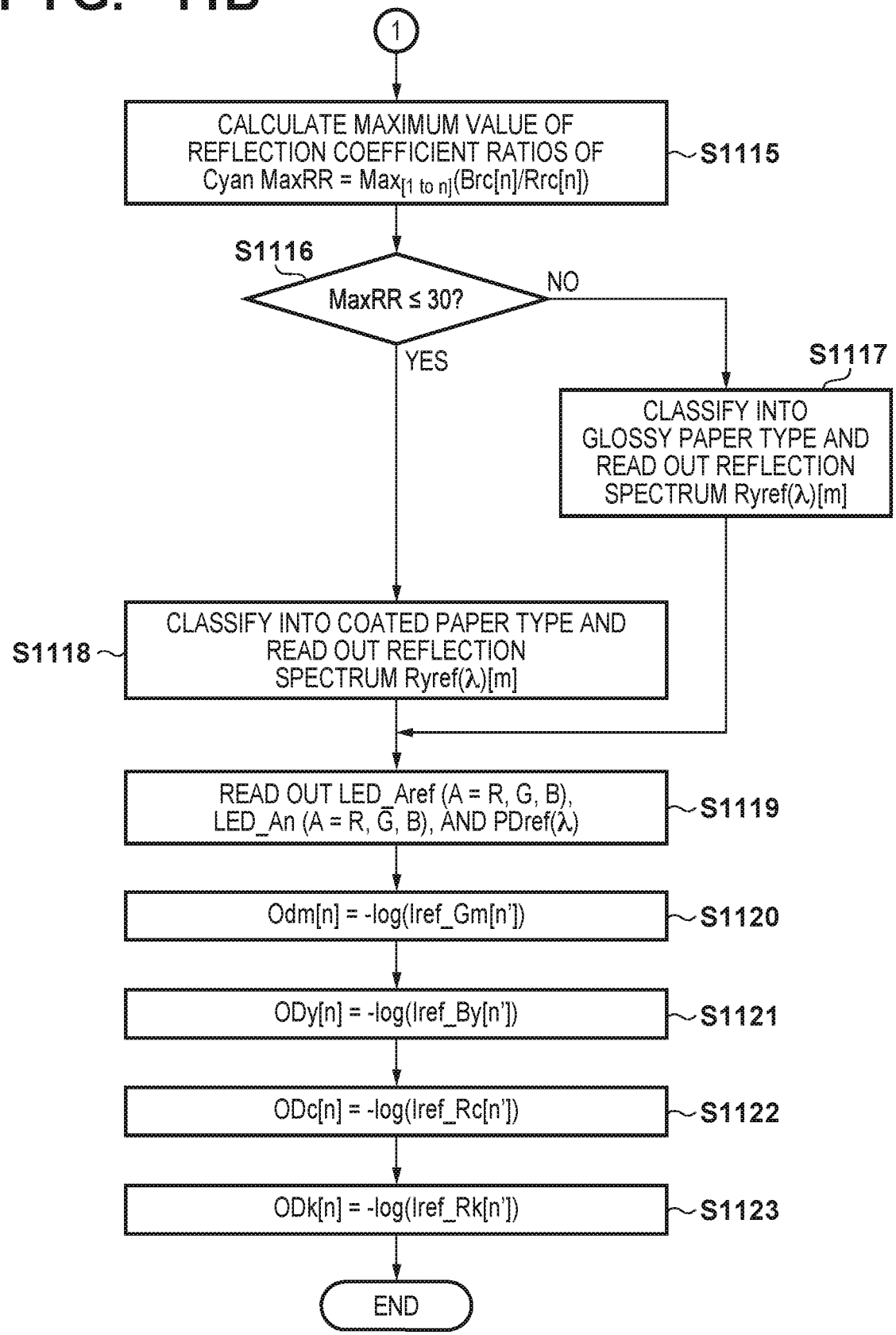

FIG. 10 is a view showing a CMYK patch chart as a density acquisition target used in density measurement processing shown in FIGS. 11A and 11B. FIGS. 11A and 11B are flowcharts showing the procedure of density measurement processing. The patch chart shown in FIG. 10 is a patch chart of four CMYK colors for density measurement. Each color has 13 tones as in the patch chart shown in FIG. 7. Individual patches in the patch chart are arranged zigzag and configured to prevent printed paper from having a concave-shaped curl.

In step S1101, upon receiving a density measurement start instruction via the input unit 202 or the display unit 205, the CPU 209 controls the units to print the patch chart for density measurement formed from single CMYK colors shown in FIG. 10. When printing ends, a paper white level as a density reference is acquired under each LED. That is, in step S1102, the CPU 209 turns on the Red LED, and measures the reflected light amount from the paper white portion of the printing medium. In step S1103, the CPU 209 turns on the Green LED, and measures the reflected light amount from the paper white portion of the printing medium. In step S1104, the CPU 209 turns on the Blue LED, and measures the reflected light amount from the paper white portion of the printing medium.

When reflected light amount acquisition in steps S1102 to S1104 ends, the patches of the patch chart printed in step S1101 are irradiated with each LED, and reflected light amounts are measured. To stabilize ink fixing on the printing medium, a predetermined wait time may be provided from the end of printing to the measurement of the reflected light amounts of the patches. The measurement of the reflected light amounts of the patches is performed using LEDs of complementary colors to the yellow and magenta patches. That is, in step S1105, the CPU 209 turns on the Green LED, and measures the reflected light amounts of the magenta patches of the respective tones. In step S1107, the CPU 209 turns on the Blue LED, and measures the reflected light amounts of the yellow patches of the respective tones.

When the measurement of the reflected light amounts of the patches of all tones ends for each color, the reflection coefficient (the ratio of the reflected light amount) of each patch with respect to the paper white portion is calculated. That is, in step S1106, the CPU 209 calculates the reflection coefficients of the magenta patches of the respective tones with respect to the paper white portion by $$Grm[n]=(Gm[n]/Gw) \ (n: \text{tones 1 to 13}) \quad (3)$$

Additionally, in step S1108, the CPU 209 calculates the reflection coefficients of the yellow patches of the respective tones with respect to the paper white portion by $$Bry[n]=(By[n]/Bw) \ (n: \text{tones 1 to 13}) \quad (4)$$

Next, the cyan patches are irradiated with each of the Blue LED and the Red LED, and the reflected light amounts are measured. Then, the reflection coefficients of the patches with respect to the paper white portion are calculated for each of the two colors. That is, the same processes as steps S606 to S609 of FIG. 6 are performed in steps S1109 to S1112.

Next, in step S1113, the CPU 209 turns on the Red LED, and measures the reflected light amounts of the black patches. In step S1114, the CPU 209 calculates the reflection coefficients of the black patches of the respective tones with respect to the paper white portion by $$Ryk[n]=(Rk[n]/Rw) \ (n: \text{tones 1 to 13}) \quad (5)$$

The reflection spectrum of a patch printed by black ink almost remains the same under the three LED colors. Hence, although the reflected light amounts of the black patches are measured under the Red LED in FIGS. 11A and 11B, the Blue LED or Green LED may be used.

When the measurement of the reflected light amounts of the patches ends, the type of the printing medium on which the patches are printed is classified. That is, the same processes as steps S610 to S613 of FIG. 6 are performed in steps S1115 to S1118. However, in step S1117, the CPU 209 reads out the information of the reflection spectrum of a printing medium of a glossy paper type, which is saved in the storage unit such as the RAM in advance. In step S1118, the CPU 209 reads out the information of the reflection spectrum of a printing medium of a coated paper type, which is saved in the storage unit such as the RAM in advance. In steps S1117 and S1118, pieces of information of reflection spectra as many as the number of tones of the patches printed in step S1101 are read out. That is, in this example, in each of steps S1117 and S1118, pieces of information of reflection spectra corresponding to 13 tones are read out.

Next, in step S1119, the CPU 209 reads out the radiation spectrum (reference spectral characteristic) of the LED of the reference sensor (reference light source), the radiation spectrum of the LED of the sensor used when measuring the reflected light amounts of the patches, and the light-receiving spectral sensitivity of the photodiode. Since the radiation spectrum of the LED is information about an individual difference, information saved in the internal memory of the sensor may be read out.

When the pieces information of the spectra are read out, a density corresponding to the reading result of the reference sensor is obtained based on the reflected light amounts measured under each color LED. In step S1120, the CPU 209 obtains a density corresponding to the reading result of the reference sensor for the magenta patches (sensor correction). In step S1121, the CPU 209 obtains a density corresponding to the reading result of the reference sensor for the yellow patches. In step S1122, the CPU 209 obtains a density corresponding to the reading result of the reference sensor for the cyan patches. In step S1123, the CPU 209 obtains a density corresponding to the reading result of the reference sensor for the black patches. The sensor correction operation in step S1120 will be described below as the representative of the processes of steps S1120 to S1123. The processes of steps S1121 to S1123 are performed in the same way as in step S1120.

In step S1120, the CPU 209 applies the values read out in step S1119 to equation (2), thereby estimating a spectral reflectance characteristic Ry(×) of the patches. The light-receiving amount In Gm[n] in equation (2) corresponds to the reflection coefficient Grm[n] obtained in step S1106. Hence, for a specific tone, the CPU 209 sequentially inputs the information of the reflection spectra of the 13 tones read out in step S1117 or S1118 to equation (2), and compares the calculated values with Grm[n]. The CPU 209 then specifies a reflection spectrum Ryref(λ) closest to Grm[n].

For example, only the saved reflection spectra of 13 tones may be compared, or halftones may be obtained by calculation. In this case, linear interpolation in the reflectance direction of each wavelength may be performed for reflection spectra corresponding to two tones a and (a+1), thereby obtaining the reflection spectrum of the halftone between a and (a+1). Alternatively, using reflection spectra corresponding to a plurality of tones, a new reflection spectrum may be obtained by an interpolation method using a spline.

Ryref(λ) specified above is estimated as the reflection spectrum of the patch of the specific tone. Hence, Iref_Gm[n'] calculated from equation (1) using the reflection spectrum Ryref(λ) is estimated as a light-receiving amount when the measurement target patch is measured by the reference sensor. After that, the CPU 209 converts the estimated Iref_Gm[n'] into density information. For example, the CPU 209 takes a logarithm of Iref_Gm[n'] and obtains the resultant value as a density. The density corresponds to a measurement result obtained using the reference sensor.

In steps S1121 to S1123 as well, the same process as step S1120 is performed. Note that in FIGS. 11A and 11B, sensor correction is performed even for the black patches. However, since the shape of the reflection spectrum of an achromatic patch is almost flat with respect to the wavelength, and an error caused by a spectral variation of the LED becomes small even without sensor correction, the process of step S1123 need not always be performed.

As described above, according to this embodiment, it is possible to easily determine the type of a printing medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087072, filed Apr. 21, 2015, which is hereby incorporated by reference herein in its entirety.

What is claimed is:

1. An information processing apparatus comprising:
one or more memory devices that store a set of instructions; and
one or more processors that execute the set of instructions to perform operations including:
(1) causing a first light source to irradiate a patch, which is printed on a printing medium, with light emitted by the first light source;
(2) acquiring a first reflected light amount on a basis of light which is emitted from the first light source and reflected on the patch;
(3) causing a second light source to irradiate the patch with light which is emitted by the second light source and of which a wavelength band is different from a wavelength band of light emitted from the first light source;
(4) acquiring a second reflected light amount on a basis of light which is emitted from the second light source and reflected on the patch;
(5) acquiring a ratio of the first reflected light amount and the second reflected light amount; and
(6) determining by comparing the ratio with a reference value, parameters for printing by a print unit on the printing medium on which the patch is printed.

2. The apparatus according to claim 1, wherein the wavelength band of light emitted from the first light source is shorter than the wavelength band of light emitted from the second light source.

3. The apparatus according to claim 2, wherein, in the determining, the one or more processors determine, based on whether the ratio is higher than the reference value, whether the printing medium on which the patch is printed is a printing medium of a first type or a printing medium of a second type different from the first type and determine the parameters depending on the determined type of print medium.

4. The apparatus according to claim 3, wherein the printing medium of the first type is a printing medium whose receptor layer has a particle smaller than an ink particle, and the printing medium of the second type is a printing medium whose receptor layer has a particle larger than the ink particle, and
wherein, in the determining, the one or more processors determine that the printing medium on which the patch is printed is the printing medium of the first type when the ratio is higher than the reference value, and determines that the printing medium on which the patch is printed is the printing medium of the second type when the ratio is lower than the reference value.

5. The apparatus according to claim 4, wherein the printing medium of the first type includes glossy paper, and
wherein the printing medium of the second type includes coated paper.

6. The apparatus according to claim 3, wherein, in the determining, the one or more processors determine, based on a maximum value of ratios acquired for a gradation, the type of the printing medium on which the patch is printed and determine the parameters depending on the determined type of print medium.

7. The apparatus according to claim 1, wherein the one or more processors further execute the set of instructions to perform operations including:
measuring a third reflected light amount from a density acquisition target patch under a third light source;
acquiring a first spectral characteristic of the third light source;
acquiring a second spectral characteristic of a reference light source;
estimating a spectral characteristic of the density acquisition target patch based on the third reflected light amount and the first spectral characteristic of the third light source; and
acquiring a density of the density acquisition target patch based on the estimated spectral characteristic of the density acquisition target patch and the acquired second spectral characteristic of the reference light source.

8. The apparatus according to claim 7, wherein a difference between the first spectral characteristic of the third light source and the second spectral characteristic of the reference light source corresponds to an individual difference of the third light source.

9. The apparatus according to claim 7, wherein, in the estimating, the one or more processors estimate the spectral characteristic of the density acquisition target patch based on a plurality of reference spectral characteristics corresponding to the determined type of the printing medium.

10. The apparatus according to claim 9, wherein the one or more processors further execute the set of instructions to perform operations including:
   comparing a plurality of reflected light amounts calculated from the spectral characteristic of the third light source with the third reflected light amount; and
   specifying a reflection spectral characteristic whose calculation result is closest to the third reflected light amount,
   wherein, in the estimating, the one or more processors estimate the specified reflection spectral characteristic as the spectral characteristic of the density acquisition target patch.

11. The apparatus according to claim 1, wherein each of the first light source and the second light source comprises a light source configured to emit light in one of R (red), G (green), and B (blue).

12. The apparatus according to claim 1, wherein the patch is a patch printed in one of cyan, magenta, yellow, and black.

13. The apparatus according to claim 1, wherein the one or more processors further execute the set of instructions to cause the print unit to print the patch on the printing medium.

14. The apparatus according to claim 1, wherein, in the determining, the one or more processors determine a type of the printing medium on which the patch is printed, by comparing the ratio with the reference value, and wherein in the determining, the one or more processors determine the parameters for printing based on the determined type of the printing medium.

15. The apparatus according to claim 1, wherein, in the acquiring, the one or more processors acquire the first reflected light amounts on a basis of light which is emitted from the first light source and reflected on a plurality of patches printed on the printing medium, and, in the acquiring, the one or more processors acquire the second reflected light amounts on a basis of light which is emitted from the second light source and reflected on the plurality of patches.

16. An information processing apparatus comprising:
   one or more memory devices that store a set of instructions; and
   one or more processors that execute the set of instructions to perform operations including:
   (1) spectrally dividing reflected light from a patch printed on a printing medium under a predetermined light source and acquiring first spectral light amounts respectively from the patch in a first wavelength band;
   (2) acquiring second spectral light amounts respectively from the patch in a second wavelength band different from the first wavelength band; and
   (3) determining, based on the first spectral light amounts and the second spectral light amounts, parameters for printing the printing medium on which the patch is printed.

17. The apparatus according to claim 16, wherein the predetermined light source comprises a light source configured to emit white light.

18. A processing method comprising;
   irradiating a patch, which is printed on a printing medium, with light emitted by a first light source;
   acquiring a first reflected light amount on a basis of light which is emitted from the first light source and reflected on the patch;
   irradiating the patch with light which is emitted by a second light source and of which a wavelength band is different from a wavelength band of light emitted from the first light source;
   acquiring a second reflected light amount on a basis of light which is emitted from the second light source and reflected on the patch;
   acquiring a ratio of the first reflected light amount and the second reflected light amount; and
   determining, by comparing the ratio with a reference value, parameters for printing by a print unit on the printing medium on which the patch is printed.

19. The processing method according to claim 18, further comprising printing the patch on the printing medium.

* * * * *